United States Patent Office 3,519,660
Patented July 7, 1970

3,519,660
ALDEHYDES OF THE PREGNANE SERIES AND DERIVATIVES THEREOF
Julius Schmidlin and Ludwig Ehmann, Basel, Switzerland, assignors to Ciba Corporation, New York, N.Y., a corporation of Delaware
No Drawing. Filed Dec. 4, 1967, Ser. No. 687,481
Claims priority, application Switzerland, Dec. 9, 1966, 17,634/66
Int. Cl. C07c 169/34
U.S. Cl. 260—397.45                                    13 Claims

ABSTRACT OF THE DISCLOSURE

The derivatives of the 6α-fluoro and 6α,9α-difluoro-16α methyl-prednisolone having an aldehyde in 21-position instead of the hydroxyl group, and functional derivatives thereof, such as hydrates, acetals and esters of the hydrates, and in which the 17-hydroxy group is esterified, display an anti-inflammatory and thymolytic activity and have also antileucaemic activity. These new compounds are prepared by conventional methods.

SUMMARY OF THE INVENTION

The present invention concerns and has for its object the provision of new 21-aldehydes of the pregnane series and of their derivatives having the following general formula (I)

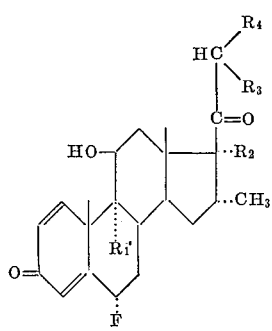

in which $R_1$ represents a hydrogen or fluorine atom, $R_2$ an esterified hydroxyl group, and $R_3$ and $R_4$ each a free, esterified or etherified hydroxyl group or $R_3+R_4$ represent an oxo group. The products of the invention possess anti-inflammatory, thymolytic and antileucaemic activity and may be used as antiphlogistics and antileucaemic medicaments. They are also valuable as intermediates.

DESCRIPTION OF THE PREFERRED EMBODIMENTS

In the new compounds of the above formula the said esterified hydroxy groups are above all derived from organic carboxylic acids of the aliphatic, alicyclic, aromatic or heterocyclic series especially those with 1 to 18 carbon atoms, e.g. from formic, acetic, propionic, a butyric acid or valeric acid such as n-valeric acid, or from trimethylacetic or trifluoracetic acid, from a caproic acid such as β-trimethylpropionic acid or diethylacetic acid, or oenanthic, caprylic, pelargonic, capric acid, from an undecylic acid, for example undecylenic acid, from lauric, myristic, palmitic or a stearic acid, for example oleic acid, from a cyclopropane-, cyclobutane-, cyclopentane- or cyclohexane-carboxylic acid, for example, cyclopropylmethanecarboxylic, cyclobutylmethanecarboxylic, cyclopentylethanecarboxylic, cyclohexylethanecarboxylic acid, from cyclopentyl-, cyclohexyl- or phenyl-acetic or -propionic acids or benzoic acid, or phenoxyalkanoic acids such as phenoxyacetic acid, dicarboxylic acids such as succinic, phthalic or quinolic acid, or furan-2-carboxylic, 5-tertiary-butyl-furan-2 - carboxylic, 5 - bromo-furan-2-carboxylic acid, from nicotinic or isonicotinic acid, or from sulphonic acids such as benzenesulphonic acids, or of inorganic acids, for example phosphoric or sulphuric acids.

Particularly valuable etherified hydroxyl groups are those which are derived from alcohols with 1 to 8 carbon atoms, such as lower aliphatic alkanols, for example, ethanol, methanol propanol, isopropanol, a butyl or amyl alcohol, or from araliphatic alcohols, especially from monocyclic aryl-lower aliphatic alcohols such as benzyl alcohol, or from heterocyclic alcohols, such as α-tetrahydropyranol or furanol.

Special mention deserve also cyclic ethers derived from polyhydric alcohols, for example from ethyleneglycol, from the propyleneglycols or butyleneglycols.

The new compounds of the above Formula I possess valuable pharmacological properties. Inter alia, they display above all an anti-inflammatory and thymolytic activity as can be shown in the animal test, for example on rats. Furthermore, as can be shown, for example, in the animal test, for instance on rats (Fischer rats RS) they have an antileucaemic activity. The new compounds may therefore be used as antiphlogistics and antileucaemic medicaments. The new compounds are also valuable intermediates for the manufacture of other useful substances, especially pharmacologically active compounds.

Particularly valuable are those compounds of the above Formula I—in which $R_3$ and $R_4$ each represents a free or etherified hydroxyl group, or a free hydroxyl group with an etherified hydroxyl group, or $R_3+R_4$ stand for an oxo group, the etherified hydroxyl groups being derived from alkanols with 1 to 3 carbon atoms and $R_7$ representing a lower aliphatic acyloxy group—and especially the 21-methyl-hemiacetal of $\Delta^{1,4}$-3,20,21-trioxo-6α,9α-difluoro-11β-hydroxy-17α - propionoxy-16α-methylpregnadiene which, for example when given to the rat subcutaneously in a dose of 0.01 to 0.1 mg. per kg. body-weight, produces a distinct antiphlogistic effect.

The compounds of the above Formula I are accessible by known methods; more especially, they are obtained (a) when in a compound of the general formula (II)

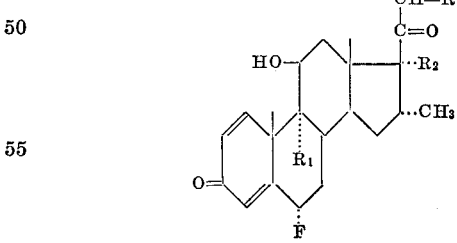

in which $R_1$ represents a hydrogen or fluorine atom, $R_2$ an esterified hydroxy group and R a residue convertible into the oxo group or into the group

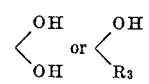

wherein $R_3$ is an etherified hydroxyl group, the residue is so converted; or (b) when a double bond is introduced in known manner into the 1,2-position of a compound of the formula (III)

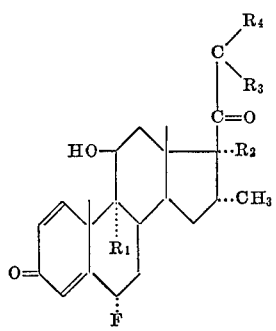

in which $R_1$ to $R_4$ have the same meanings as in Formula I; or (c) by introducing an 11β-hydroxyl group in known manner into a compound of the formula (IV)

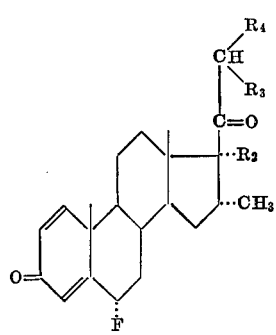

wherein $R_2$ to $R_4$ have the same meanings as in the Formula I; or (d) by splitting the 9β,11β-epoxide group in a compound of the formula (V)

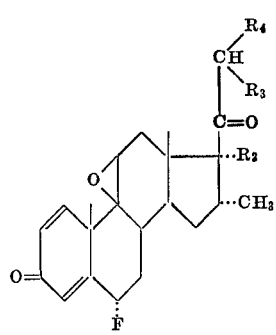

in which $R_2$ to $R_4$ have the same meanings as in the Formula I with hydrogen fluoride or with hydrogen fluoride donors; or (e) converting the free hydroxyl in 17-position in a compound of the formula (VI)

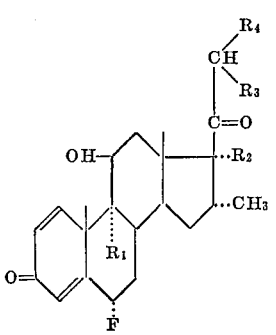

wherein $R_1$, $R_3$, $R_4$ have the same meanings as in the Formula I and $R_2$ stands for a free hydroxyl group, into an esterified hydroxyl group, and, if desired, by treating a resulting compound of the Formula I, in which

represents a free oxo group or at least one of the groups $R_3$, $R_4$ is a free hydroxyl group, with an esterifying or etherifying reagent, or treating a compound of the Formula I, in which at least one of the groups $R_3$, $R_4$ represents an esterified or etherified hydroxyl group, with a hydrolyzing reagent.

When the grouping

is introduced into a compound of the Formula II by converting the group R by the above method (a), the latter is preferably a free hydroxyl group together with a hydrogen atom which is converted in known manner into the aldehyde group or one of its above-mentioned derivatives. According to a preferred variant of the process the 21-hydroxyl group is converted into a sulphonic acid ester, for example into the para-tosyl ester, the latter is converted with a tertiary aromatic base (for example with pyridine) into the quaternary salt, the salt is converted in a weakly alkaline solution with a para-nitroso-dialkylaniline (for example para-nitroso-dimethylaniline) into the 21-nitrone, and the latter is hydrolyzed with a dilute aqueous mineral acid to the desired 21-aldehyde.

Another generally suitable process is the direct dehydrogenation of the 21-hydroxypregnanes used as starting materials with reducible metal salts in known manner. The oxidant used is, for example, cupric acetate in a suitable solvent such as methanol or ethanol, if desired or required in the presence of an acid, for example of acetic acid. According to a special variant of this dehydrogenation the 21-hydroxypregnane is treated with molecular oxygen in the presence of the above-mentioned reducible metal salts, for example cupric acetate, used in a catalytic proportion. Alternatively, the dehydrogenation of the 21-hydroxyl group in the starting materials mentioned may be carried out with selenium dioxide, advantageously in a suitable solvent, such as methanol or glacial acetic acid. The reaction may be accelerated or completed by heating. Finally, the dehydrogenation may also be achieved with manganese dioxide.

The final products obtained from the starting materials mentioned by dehydrogenation in the 21-position with the aid of the processes described above are obtained in different forms, depending on the method of isolation used. Inter alia, the aldehydes formed generally settle out from anhydrous alcohols in the form of their hemiacetals. From hydroxyl-free solvents in the presence of water the 21,21-dihydroxy compounds corresponding to the aldehydes are formed which, generally when just left to themselves over phosphorus pentoxide, lose water and pass into the yellow, free aldehydes.

When the free aldehydes or their hemiacetals or the corresponding 21,21-dihydroxy compounds are treated with acylating agents, such as a carboxylic acid halide or anhydride, for example acetic anhydride, preferably in the presence of a strong inorganic acid, for example sulphuric acid or an organic sulphonic acid such as para-toluenesulphonic acid, or a tertiary base such as pyridine, they yield the 21,21-diacyl esters.

When the free aldehydes or their hemiacetals or the corresponding 21,21-dihydroxy compounds of the Formula I are reacted with alcohols in the presence of an acid catalyst, the corresponding diacetals are obtained. A corresponding reaction with polyhydric alcohols furnishes the afore-mentioned cyclic acetals. Alternatively, the acetals may be formed by reacting the free aldehydes or their hemiacetals or the corresponding 21,21-dihydroxy compounds with orthoformic acid esters of the relevant alcohols.

If desired, the afore-mentioned diacylates and acetals may be converted by acid or alkaline hydrolysis into the free aldehydes or into the corresponding 21,21-dihydroxy compounds.

21,21-diacylates and 21,21-diacetals are also accessible from compounds of the above Formula I in which R stands for two halogen atoms, for example two bromine atoms. Such 21,21-dihalogeno compounds can be converted, for example with metal acylates of the first group of the Periodic Table, such as an alkali metal acetate or silver acetate, into the corresponding 21,21-diacylates, or with an alkali metal alcoholate, for example sodium methylate, into the 21,21-diethers.

The double bond is introduced into compounds of the Formula III by method (b) with the use of a known chemical or microbiological dehydrogenating method. From among the former there may be mentioned as an example the dehydrogenation by means of selenium dioxide or selenous acid, preferably in a tertiary aliphatic alcohol, such as tertiary butanol or tertiary amyl alcohol or with 2,3-dichloro-5,6-dicyano-1,4-benzoquinone in boiling benzene or dioxane. For dehydrogenation in the 1,2-position a bromine atom may be introduced in known manner in the 2-position which is then eliminated in the form of hydrogen bromide.

The microbiological dehydrogenation is performed, for example with cultures of microorganisms of the species *Corynebacterium simplex, Septomyxa affinis* or *Didymella lycopersici* or with their enzymes isolated from the mycelium.

The introduction of a hydroxyl group in position 11β according to the above method (c) is likewise carried out by the microbiologiical route, using the microorganisms described in the literature, especially those of the genera Curvularia, for example *Curvularia lunata* or *Curvularia pallescens*.

According to method (d) the 9β,11β-epoxide group is split in known manner with hydrogen fluoride, using it in the anhydrous form, if desired or required in an inert solvent such as chloroform, tetrahydrofuran or especially dimethyl-formamide or in aqueous hydrofluoric acid. It is also possible to use a hydrogen fluoride donor, for example a salt of this acid with a tertiary organic base, for example pyridine, or a derivative of hydrofluoric acid. A particularly valuable process has been described and claimed in U.S. specification No. 3,211,758, according to which hydrogen fluoride is used in the form of an adduct thereof with carbamic or thiocarbamic acid, especially with urea.

Finally, according to method (e) a free hydroxyl group in position 17α is esterified by known methods. The esterification of the free 17α-hydroxyl group in compounds of the Formula VI, where

together form a free oxo group, or $R_4$ or $R_3$ is a free hydroxyl group and $R_3$ or $R_4$ an etherified hydroxyl group, takes place, for example, on treatment with an orthocarboxylic acid ester, such as an orthoformic, orthoacetic or orthopropionic acid ester. This leads to 17,21-orthoesters containing a free or etherified hydroxyl group in the 21-position, and from these esters the 17α-esters containing a free 21-aldehyde group are accessible by acid hydrolysis under mild conditions.

The free 21-aldehydes obtained by methods (b) to (e), or the 21,21-dihydroxy compounds accessible therefrom by hydration—can be converted into the hemiacetals, acetals and acylates as described above under (a).

The compounds of the above Formulae II to VI to be used as starting materials are known or may be prepared by known methods. More especially, an aldehyde group in the compounds of the Formulae III to VI may be formed in the same manner as described above for method (a), and the aldehyde group may, if desired, be converted into the acetals, hemiacetals or esters in known manner.

The invention includes also any variant of the present process in which an intermediate obtained at any stage thereof is used as starting material and any remaining steps are carried out or in which a starting material is formed under the reaction conditions.

The present invention is also concerned with the formulation of pharmaceutical preparations for use in human and veterinary medicine that contain the above-described pharmacologically active substance of the present invention in admixture or conjunction with a pharmaceutical excipient. Suitable excipients are inorganic or organic substances suitable for enteral, for example oral, parenteral or local administration. As such excipients there may be used substances that do not react with the new compounds, for example water, gelatin, lactose, starches, magnesium stearate, talcum, vegetable oils, benzyl alcohols, gums, polyalkylene-glycols, white petroleum jelly, cholesterol or other known medicinal excipients. The pharmaceutical preparations may be solid, for example tablets, dragées or capsules, or in liquid or semiliquid form solutions, suspensions, emulsions, ointments or creams. If desired, these pharmaceutical preparations may be sterilized and/or contain assistants such as preserving, stabilizing, wetting or emulsifying agents, salts for regulating the osmotic pressure or buffers. They may further contain other therapeutically valuable substances. The new compounds may also be used as starting materials for the manufacture of other valuable compounds.

The compounds of this invention may also be used as additives to animal fodder.

The following examples illustrate the invention.

EXAMPLE 1

A solution of 4.67 g. of $\Delta^{1,4}$ - 6α,9α - difluoro - 16α-methyl - 11β,21 - dihydroxy-17α-propionoxy-3,20-dioxo-pregnadiene in 320 ml. of methanol is mixed with a solution of 0.8 g. of cupric acetate monohydrate in 160 ml. of methanol, and while stirring the solution oxygen is passed through for 4 hours at room temperature. The ultramarine coloration appearing immediately when the two solutions are mixed rapidly turns paler as oxygen is passed through and then turns rather to bluish green. A solution of 1 g. of ethylenediaminotetraacetic acid in 100 ml. of water and 0.7 ml. of N-soduim hydroxide solution is added and the resulting, deep blue reaction solution is concentrated under vacuum at 30 to 40° C. bath temperature to 50 to 100 ml. The reaction product crystallizes in the form of fine needles, it is suctioned off, washed copiously with water and then with deep-cooled methanol, and dried at 60 to 70° C. under vacuum.

There are obtained 2.30 g. of $\Delta^{1,4}$-6α,9α-difluoro - 16α-methyl - 11β - hydroxy-17α - propionoxy - 3,20,21-trioxo-pregnadiene in the form of its 21-methyl-hemiacetal melting at 222 to 224° C. Optical rotation $[\alpha]_D$ 20°=+43° (c.=1% in dioxane).

On being worked up, the mother liquor furnishes a further quantity of the identical substance.

The starting compound may be prepared as follows:

A mixture of 6.0 g. of $\Delta^{1,4}$-6α,9α-difluoro-16α-methyl-11β,17α,21-trihydroxy-3,20 - dioxo-pregnadiene, 0.025 g. of p-toluene sulfonic acid, 6.0 ml. of dimethylformamide and 6 ml. of orthopropionic acid triethylester is heated for 4 hours at 115° under stirring in an atmosphere of nitrogen.

The clear reaction solution is cooled and completely evaporated in vacuum after having added 0.5 ml. of pyridine. The slightly reddish crystalline residue (7.4 g.) is triturated with 25 ml. of methanol, filtered, washed with a little cooled methanol, and dried in a vacuum at 60–70°. There are obtained 5.58 g. of the $\Delta^{1,4}$-6α,9α-difluoro - 16α - methyl - 11β-hydroxy-17α,21-(1'-ethoxy)-propylidenedioxy-3,20 - dioxo - pregnadiene melting at 236–237° as practically colorless crystals. $[\alpha]_D^{20°} = +41°$ (c.=1% in dioxane).

38.5 g. of the last named product are suspended in 1000 ml. of methanol. 60 ml. of 2 N aqueous solution of oxalic acid are added after having warmed up the solution, under stirring, to 45°. While stirring efficiently the mixture is kept for 30 minutes at 45°, after which period a clear solution is formed. The reaction solution is then immediately poured on 2000 ml. of a saturated aqueous solution of sodium bicarbonate and the mixture thus obtained is extracted with 3× 1000 ml. of methylene chloride.

The combined extracts are washed with 3× 1000 ml. of water, dried over soduim sulfate, filtered and completely evaporated in vacuo. There are obtained 35.9 g. of $\Delta^{1,4}$-6α,9α - difluoro - 16α-methyl-11β,21 - dihydroxy-17α-propionoxy-3,20-dioxo-pregnadiene of melting point 230–231°. $[\alpha]_D^{20°} = +11°$ (c.=1% in dioxane).

EXAMPLE 2

2 ml. of a 0.05 molar solution of cupric acetate monohydrate in methanol are added to a solution of 108.2 mg. of $\Delta^{1,4}$-6α-fluoro-16α - methyl - 11β,21 - dihydroxy-17α-acetoxy-3,20-dioxo-pregnadiene in 8 ml. of methanol. A strong current of oxygen is passed into the solution in the course of two hours, while stirring. 2 ml. of a 0.03–molar aqueous solution of the disodium salt of the ethylenediaminotetraacetic acid is added and the whole batch is then concentrated in a vacuum to a volume of 1 ml., after first having added 1 ml. of water. Upon cooling to 0° C. the reaction product separates in crystalline form; it is collected on a filter, washed with a little ice-cold water and dried in a vacuum over calcium chloride. There are obtained 92 mg. of the $\Delta^{1,4}$-6α-fluoro-methyl-11β-hydroxy-17α-acetoxy-3,20,21-trioxo-pregnadiene in the form of its 21-methyl-hemiacetal which melts at 251–255° (yellow color and slight decomposition).

The starting compound used may be prepared as follows:

3.905 g. of $\Delta^{1,4}$-6α-fluoro-16α-methyl-11β,17α-21-dihydroxy-3,20-dioxo-pregnadiene are dissolved in 5 ml. of a 0.02-molar solution of p-toluene sulfonic acid monohydrate in dimethylformamide in an atmosphere of nitrogen, 5 ml. of orthoacetic acid triethyl ester added and the mixture is heated at 112–115° C. for 4 hours. The reaction mixture is then cooled to 20° C. with exclusion of moisture, 0.20 ml. of pyridine is added and the batch evaporated at 0.05 torr. The resinous residue is dissolved in a mixture of ethyl acetate+ether 2:1, the solution obtained is washed several times with water, dried with sodium sulfate and evaporated in vacuum. The crude product is recrystallized from ether using acetone as solution promotor and there are thus obtained 3.847 g. of pale yellow crystals.

They are dissolved in 40 ml. of a mixture of chloroform and acetone 95:5 and purified by chromatography using a column of 250 g. silicagel prepared with the same solvent mixture. The portions eluted with chloroform+acetone (95:5) which are unitary according to thin layer chromatographic analysis are combined and recrystallized from ether yielding 3.365 g. of the $\Delta^{1,4}$-6α-fluoro-16α-methyl-11β-hydroxy - 17α,21 - (1' - ethoxy)-ethylidenedioxy--3,20-dioxo-pregnadiene in the form of colorless needles of melting point 140–142° C./202–210° C.

5 ml. of a 2 N aqueous solution of oxalic acid are added dropwise in the course of 5 minutes at a temperature of 25–28° C. to a solution of 1.150 g. of $\Delta^{1,4}$-6α-fluoro-16α-methyl - 11β - hydroxy - 17α,21 - (1'-ethoxy-)-ethylidenedioxy-3,20-dioxo-pregnadiene in 95 ml. of methanol, prepared in an atmosphere of nitrogen. During the following 15 minutes the mixture is warmed up to 50–53° C. and is kept at this temperature for a further 10 minutes. The batch is then cooled to 0° C., neutralized with 50 ml. of a 0.2 N-sodium bicarbonate solution and freed from the methanol by evaporation in vacuum. The aqueous residue is immediately extracted with a mixture of ethyl acetate and ether 2:1, the extract washed with 0.04 N-sodium bicarbonate solution and with water, dried with sodium sulfate and evaporated in vacuum. The amorphous crude product contains besides the desired 17α-monoacetate a minor quantity of the 21-monoacetate, which can be separated by dissolving the crude product in 20 ml. of chloroform+acetone (75:25) and chromatographing on 100 g. of silicagel. The 21-acetate is containel in the portions first eluted with chloroform+acetone (75:25). The following portions eluted with the same solvent mixture, which are unitary according to their thin layer chromatogram, are united and recrystallized from acetone+ether (1:4). There are thus obtained 735 mg. of pure $\Delta^{1,4}$-6α-fluoro-16α-methyl-11β,21-dihydroxy-17α-acetoxy - 3,20 - dioxo-pregnadiene in colorless lustrous plates of melting point 215–217° C.

EXAMPLE 3

2.6 g. of $\Delta^{1,4}$-6α,9α-difluoro-16α-methyl-11β,21-dihydroxy-17α-benzoyloxy - 3,20 - dioxo-pregnadiene are dissolved in 200 ml. of methanol. After the addition of a solution of 0.4 g. of copper (II)-acetate monohydrate in 80 ml. of methanol, oxygen is passed through the solution for 4 hours while stirring at room temperature. The ultramarine blue coloration which appeared immediately when the two solutions were poured together becomes paler rapidly when oxygen is introduced, and turns rather blue-green. A solution of 1 g. of ethylene diamine tetraacetic acid in 100 ml. of water and 0.7 mg. of N-sodium hydroxide solution is added, and the deep blue reaction solution so obtained is concentrated in vacuo at a bath temperature of 30–40° C. The reaction product which crystallizes out is filtered off, washed with water and finally with some deep-cooled methanol, and dried at 60–70° C. under reduced pressure. $\Delta^{1,4}$-6α,9α-difluoro-16α-methyl-11β-hydroxy-17α-benzoyloxy- 3,20,21 -trioxo-pregnadiene is obtained in the form of its 21-methyl-hemiacetal.

The starting material used in this example is prepared as follows:

6.0 g. of $\Delta^{1,4}$-6α,9α-difluoro-16α-methyl-11β,17α,21-trihydroxy-3,20-dioxo-pregnadiene are heated at 105–110° C. for 3 hours with 0.025 g. of toluene-4-sulfonic acid-monohydrate and 6.0 ml. of orthobenzoic acid triethylester in 6.0 ml. of dimethyl formamide. The slightly brownish reaction solution is then evaporated completely under reduced pressure. The residue is digested with some methanol. The difficultly soluble starting material is eliminated, the residue obtained on evaporation of the mother liquor is crystallized from toluene+acetone, and $\Delta^{1,4}$-6α,9α-difluoro-16α-methyl-11β-hydroxy- 17α,21 -(1'-ethoxy)-benzylidenedioxy-3,20-dioxo-pregnadiene of melting point 205–210° C. obtained.

2.5 g. of $\Delta^{1,4}$-6α,9α-difluoro-16α-methyl-11β-hydroxy-17α,21-(1'-ethoxy)-benzylidenedioxy - 3,20 - dioxo - pregnadiene are dissolved in 30 ml. of ethanol and the solution stirred at 40° C. for 2 minutes with 5 ml. of N-sulfuric acid. The reaction mixture is completely evaporated under reduced pressure, the residue recrystallized from dilute methanol, and $\Delta^{1,4}$-6α,9α-difluoro-16α-methyl-11β, 21-dihydroxy-17α-benzoyloxy-3,20-dioxo-pregnadiene obtained.

EXAMPLE 4

A pharmaceutical preparation in the form of an ointment for the topical application containing as active ingredient the 21-methyl-hemiacetal of $\Delta^{1,4}$-3,20,21-trioxo- 6α,9α - difluoro - 11β - hydroxy - 17α - propionoxy - 16α-methylpregnadiene:

Composition— Percent
White petroleum jelly paraffin oil _____ 65
Higher fatty alcohols waxes _____ 10
Polyoxyethylene sorbitan derivatives
  sorbitan fatty acid esters _____ 4.45
Preserving agents _____ 0.2
Perfume _____ 0.1
Water _____ 20.0
21-methyl-hemiacetal of the Δ$^{1,4}$-6α,9α-
  difluoro-16α-methyl-11β-hydroxy-17α-
  propionoxy-3,20,21-trioxo-pregnadiene _____ 0.25

The fats and the emulsifiers are melted together, the preserving agents dissolved in water and the solution is emulsified with the melt at an elevated temperature. While the batch cools a suspension of the active principle in part of the melt is worked into the emulsion and the perfume then added.

What is claimed is:

1. A compound of the formula

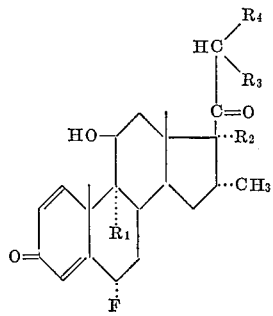

in which $R_1$ is a member selected from the group consisting of a hydrogen and a fluorine atom, $R_2$ is an esterified hydroxyl group and $R_3$ and $R_4$ each is a member selected from the group consisting of a free, an esterified and an etherified hydroxyl group and $R_3$ taken together with $R_4$ is an oxo group, each of said esterified hydroxyl groups being derived from carboxylic acids having from 1 to 18 carbon atoms and each of said etherified hydroxyl groups being derived from alcohols containing from 1 to 8 carbon atoms.

2. A compound as claimed in claim 1, wherein $R_3$ taken with $R_4$ is an oxo group and $R_2$ is a lower aliphatic carboxylic acid ester group.

3. A compound as claimed in claim 1, wherein $R_3$ taken with $R_4$ is an oxo group and $R_2$ is a monocyclic aromatic carboxylic acid ester group.

4. A compound as claimed in claim 1, wherein $R_3$ is a free hydroxyl group and $R_4$ is a lower alkoxy group and $R_2$ is a lower aliphatic carboxylic acid ester group.

5. A compound as claimed in claim 1, wherein $R_3$ is a free hydroxyl group and $R_4$ is a lower alkoxy group and $R_2$ is a monocyclic aromatic carboxylic acid ester group.

6. A compound as claimed in claim 1 having the formula

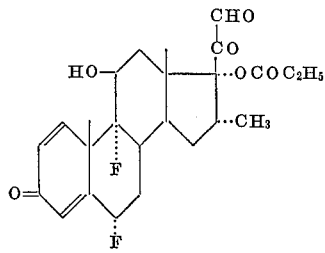

7. A compound as claimed in claim 1 having the formula

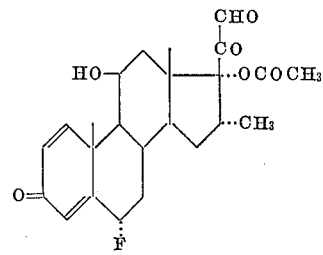

8. A compound as claimed in claim 1 having the formula

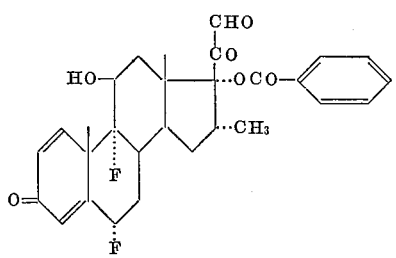

9. A compound as claimed in claim 1 having the formula

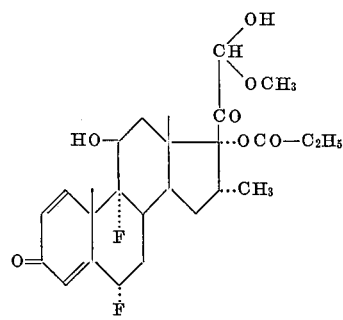

10. A compound as claimed in claim 1 having the formula

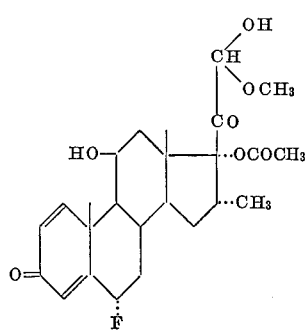

11. A compound as claimed in claim 1 having the formula

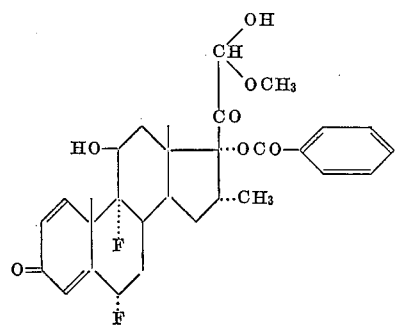

12. A compound as claimed in claim 1 wherein $R_2$ is a member selected from the group consisting of a lower aliphatic carboxylic acid ester group and a monocyclic aromatic carboxylic acid ester group and $R_3$ and $R_4$ each are lower alkoxy groups.

13. A compound as claimed in claim 1 wherein $R_2$ is a member selected from the group consisting of a lower aliphatic carboxylic acid ester group and a monocyclic aromatic carboxylic acid ester group and $R_3$ and $R_4$ each are methoxy groups.

References Cited

UNITED STATES PATENTS

| | | | |
|---|---|---|---|
| 2,841,600 | 7/1958 | Hogg et al. | 260—397.45 |
| 2,982,774 | 5/1961 | Tishler | 260—397.45 |
| 3,020,275 | 2/1962 | Marx et al. | 260—239.55 |
| 3,068,250 | 12/1962 | Arth et al. | 260—397.45 |

HENRY A. FRENCH, Primary Examiner

U.S. Cl. X.R.

260—239.55, 239.5; 195—51; 424—243